United States Patent
Phelan et al.

(10) Patent No.: US 6,830,529 B2
(45) Date of Patent: Dec. 14, 2004

(54) TORQUE TRANSFER ASSEMBLY WITH PLANETARY DIFFERENTIAL

(75) Inventors: Perry E. Phelan, deceased, late of Harsens Island, MI (US), by Marj Phelan, executor; Joseph Palazzolo, Livonia, MI (US); William P. Perkins, Dearborn, MI (US); Todd A. Kendall, Macomb, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/439,101

(22) Filed: May 15, 2003

(65) Prior Publication Data

US 2004/0048714 A1 Mar. 11, 2004

Related U.S. Application Data

(60) Provisional application No. 60/388,868, filed on Jun. 14, 2002.

(51) Int. Cl.[7] .............................................. F16H 47/04
(52) U.S. Cl. ....................... 475/221; 475/225; 475/330; 475/74; 475/84
(58) Field of Search ................................ 475/221, 225, 475/275, 330, 72, 74, 78, 83–84, 89–90

(56) References Cited

U.S. PATENT DOCUMENTS

| | | | |
|---|---|---|---|
| 2,546,173 A | | 3/1951 | Snyder |
| 2,974,545 A | | 3/1961 | Davies et al. |
| 3,447,400 A | | 6/1969 | Serniuk |
| 3,503,278 A | * | 3/1970 | Livezey ........................ 74/661 |
| 3,590,658 A | | 7/1971 | Tuck |

(List continued on next page.)

FOREIGN PATENT DOCUMENTS

| | | |
|---|---|---|
| DE | 3812060 A1 | 10/1989 |
| JP | 7-17287 | 1/1995 |
| JP | 8-282320 | 10/1996 |

OTHER PUBLICATIONS

20040058774A1.*
Copy of U.S. patent application Ser. No. 10/034,575, filed Dec. 27, 2001 to Joseph Palazzolo and Perry Phelan, entitled "Planetary Gear System For Controlling Torque Transfer In A Vehicle Driveline," (18 pages) and three sheets of drawings (FIGS. 1–3).
Combined Search and Examination Report dated Nov. 12, 2003 for Gt. Britain Application No. 0313415.2, entitled "Torque Transfer Assembly" (2 pages).

*Primary Examiner*—Tisha Lewis
(74) *Attorney, Agent, or Firm*—Dickinson Wright PLLC

(57) ABSTRACT

A torque transfer assembly including an input gear, a first output shaft, a second output shaft, a planetary differential and a torque control system. In one embodiment, the planetary differential includes first and second planetary gear set pairs each with inner and outer planetary gear sets. The torque control system includes first and second torque control mechanisms each having a control element rotating with one of the planetary gear set components as well as a controller communicating with the first and second control mechanisms and selectively controlling a resistance torque exerted by the first and second torque control mechanisms on the first and second control elements. In another embodiment, the torque control system includes a hydraulic control arrangement hydraulically intercoupling the first and second torque control mechanisms and a controller operable to selectively control the direction and amount of fluid flow in the hydraulic control arrangement and the resistance torque exerted by the first and second torque control mechanisms.

18 Claims, 7 Drawing Sheets

U.S. PATENT DOCUMENTS

| | | |
|---|---|---|
| 3,748,924 A | 7/1973 | Cross et al. |
| 3,899,941 A | 8/1975 | Cook |
| 3,924,490 A | 12/1975 | Mills |
| 4,457,394 A | 7/1984 | Suzuki |
| 4,637,275 A | 1/1987 | Whalen |
| 4,729,261 A | 3/1988 | Tervola |
| 4,917,200 A | 4/1990 | Lucius |
| 4,997,412 A * | 3/1991 | Reed .......................... 475/24 |
| 5,390,751 A | 2/1995 | Puetz et al. |
| 5,564,992 A * | 10/1996 | Cunningham ............... 475/257 |
| 5,704,459 A | 1/1998 | Antonov |
| 5,885,180 A | 3/1999 | Antonov |
| 5,971,880 A | 10/1999 | Keiser |
| 6,135,909 A | 10/2000 | Keiser |
| 6,260,440 B1 | 7/2001 | Cronin et al. |
| 6,338,689 B1 | 1/2002 | Pollman |
| 6,402,654 B1 * | 6/2002 | Lanzon et al. .............. 475/204 |
| 6,688,851 B2 * | 2/2004 | Phelan et al. ............... 417/212 |

* cited by examiner

TORQUE TRANSFER ASSEMBLY WITH PLANETARY DIFFERENTIAL

CROSS-REFERENCE TO RELATED APPLICATION

This application claims the benefit of U.S. Provisional Application No. 60/388,868, filed Jun. 14, 2002, the entire disclosure of which is hereby incorporated by reference and constitutes part of this application.

BACKGROUND OF THE INVENTION

1. Technical Field

The present invention is directed to a torque transfer assembly for a vehicle drive line and, more particularly, to a torque transfer assembly having a planetary differential.

2. Description

In order to optimize vehicle performance and driver confidence, it is desirable to provide independent torque control for each driving wheel at all times. Current torque control schemes are often of the "on demand" type, providing controlled independent wheel movement only during certain driving circumstances. As a result, the operation of the system is not seamless and smooth and the benefits of independent wheel control are limited to specific slip conditions.

Further, currently used torque control systems commonly rely upon direct wet clutch/brake technology that also suffer from the inability to efficiently and effectively dissipate heat generated during operation. The build up of heat degrades performance and, particularly at extreme temperatures, can cause system shut-down. Yet other currently available systems shift gears to obtain a fixed ratio of wheel torques. However, these systems do not permit all of the input torque to be directed to a single wheel. Additionally, available torque control assemblies suffer from operational inefficiencies such as subjecting the torque control mechanisms to undesirably large forces.

SUMMARY OF THE INVENTION

Accordingly, the present invention is directed to a planetary differential for delivering torque to each of the driving wheels. The configuration of one of the disclosed embodiments of the planetary differential provides operational and functional benefits regarding torque distribution in an arrangement that minimizes the required robustness of the torque control mechanisms. Another embodiment of the present invention includes a control system that permits a variety of operating modes including a mode wherein the planetary differential provides self-regulating torque distribution between the left and right axle output shafts while providing a centralized torque controller that enables traction control, vehicle dynamic control and high degrees of controlled torque steering in special circumstances. A further benefit of the invention is that it permits transfer of all or any fraction of the available driveline torque to any single wheel or axle. Additional benefits of the planetary differential of the present invention include the easy conversion, use, or dissipation of accumulated energy in the torque control mechanisms and an overall configuration that permits the differential to be used in a variety of applications.

In view of the above, the present invention is directed to a torque transfer assembly including an input gear, a first output shaft, a second output shaft, a planetary differential and a torque control system. In one embodiment, the planetary differential includes first and second planetary gear set pairs each with inner and outer planetary gear sets. The torque control system includes first and second torque control mechanisms each having a control element rotating with one of the planetary gear set components as well as a controller communicating with the first and second control mechanisms and selectively controlling a resistance torque exerted by the first and second torque control mechanisms on the first and second control elements. In another embodiment, the torque control system includes a hydraulic control arrangement hydraulically intercoupling the first and second torque control mechanisms and a controller operable to selectively control the direction and amount of fluid flow in the hydraulic control arrangement and the resistance torque exerted by the first and second torque control mechanisms.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawing in which:

DETAILED DESCRIPTION OF THE PREFERRED EMBODIMENT

The following description of the present invention includes two embodiments of a torque transfer assembly (shown in FIGS. 1 and 2, respectively) as well as two embodiments of a torque control system (FIGS. 4–7 and 8–12, respectively) of the torque transfer assembly. These alternative embodiments are provided for illustrative purposes with the understanding that those skilled in the art may implement modifications still encompassed by the scope of the invention defined by the appended claims. While each of the embodiments described herein relate to a rear axle application, it should be appreciated that the invention is equally applicable for front and/or rear differentials. Moreover, while a single planetary differential arrangement (driven ring gear, carrier output, and sun gear torque control) is illustrated and discussed in detail, the invention may also be used with alternate planetary differential arrangements where the roles of the inner and outer sun, ring, and planet carrier are varied to achieve the desired architecture.

Figure 1:
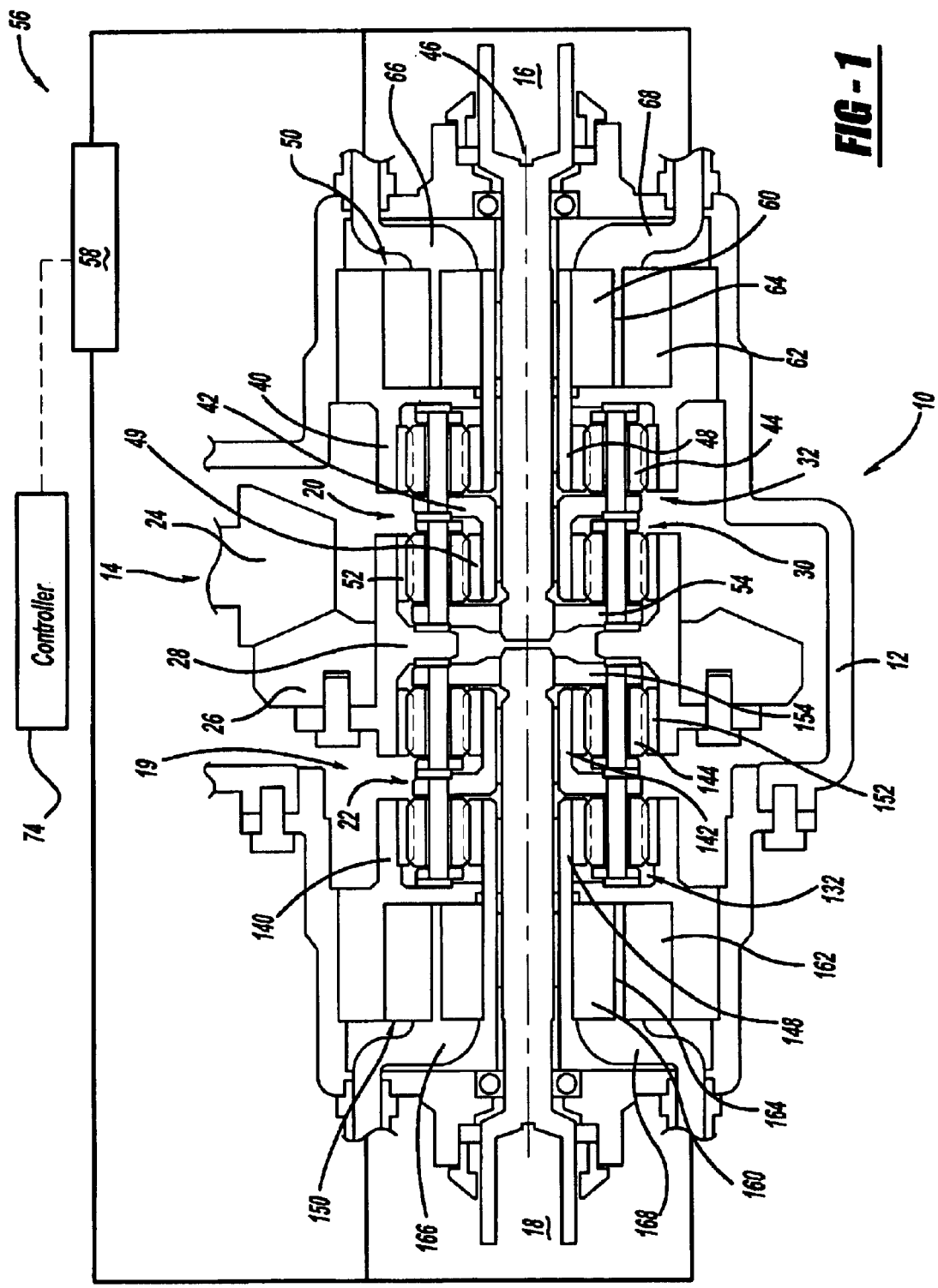
FIG. 1 is a sectional view of a first embodiment of the torque transfer assembly of the present invention with a planetary differential having two fixed displacement pumps.

A torque transfer assembly 10 is shown in FIG. 1 to include a fixed housing 12, a torque input 14, separately rotatable right and left (or first and second) output shafts 16 and 18, respectively, and a planetary differential 19 having right and left planetary gear set pairs 20 and 22, respectively. The torque input 14, including the illustrated hypoid gears 24 and 26, provides rotational input power to the planetary differential 19 and, more specifically, to ring casing 28 which has inner ring gears 52 and 152 fixed thereto. In the preferred embodiment, the hypoid gear provides approximately 2.2:1 reduction and the planetary gear sets approximately a 1.4:1 reduction so that the overall reduction from hypoid gear to output shaft during maximum reduction is approximately 3.1:1. However, the gear ratios of the respective gears may be varied without departing from the invention.

The right planetary gear set pair 20, as shown in FIG. 1, includes inner and outer planetary gear sets 30 and 32, respectively. The outer planetary gear set 32 includes a ring gear 40 fixed to the rotationally stationary housing 12, a planetary carrier 42 rotatable relative to the housing 12, planet gears 44 rotatable with the carrier 42 about central axis 46 and about their individual axes, and a sun gear 48, the rotation of which is controlled by a torque control system 56 having a torque control mechanism 50 such as a pump or motor functioning as a torque source/sink. The carrier 42 of the outer planetary gear set 32 has a gear 49 that acts as the sun gear of the inner planetary gear set 30. The inner planetary gear set 30 also includes the ring gear 52 rotating with the ring casing 28 and a planet carrier 54 fixed to rotate with the right output shaft 16. As noted above, the left planetary gear set pair 22 is configured in a manner identical to the right planetary gear set pair 20. Accordingly, similar components are identified by similar reference numerals increased by 100.

Figure 2:
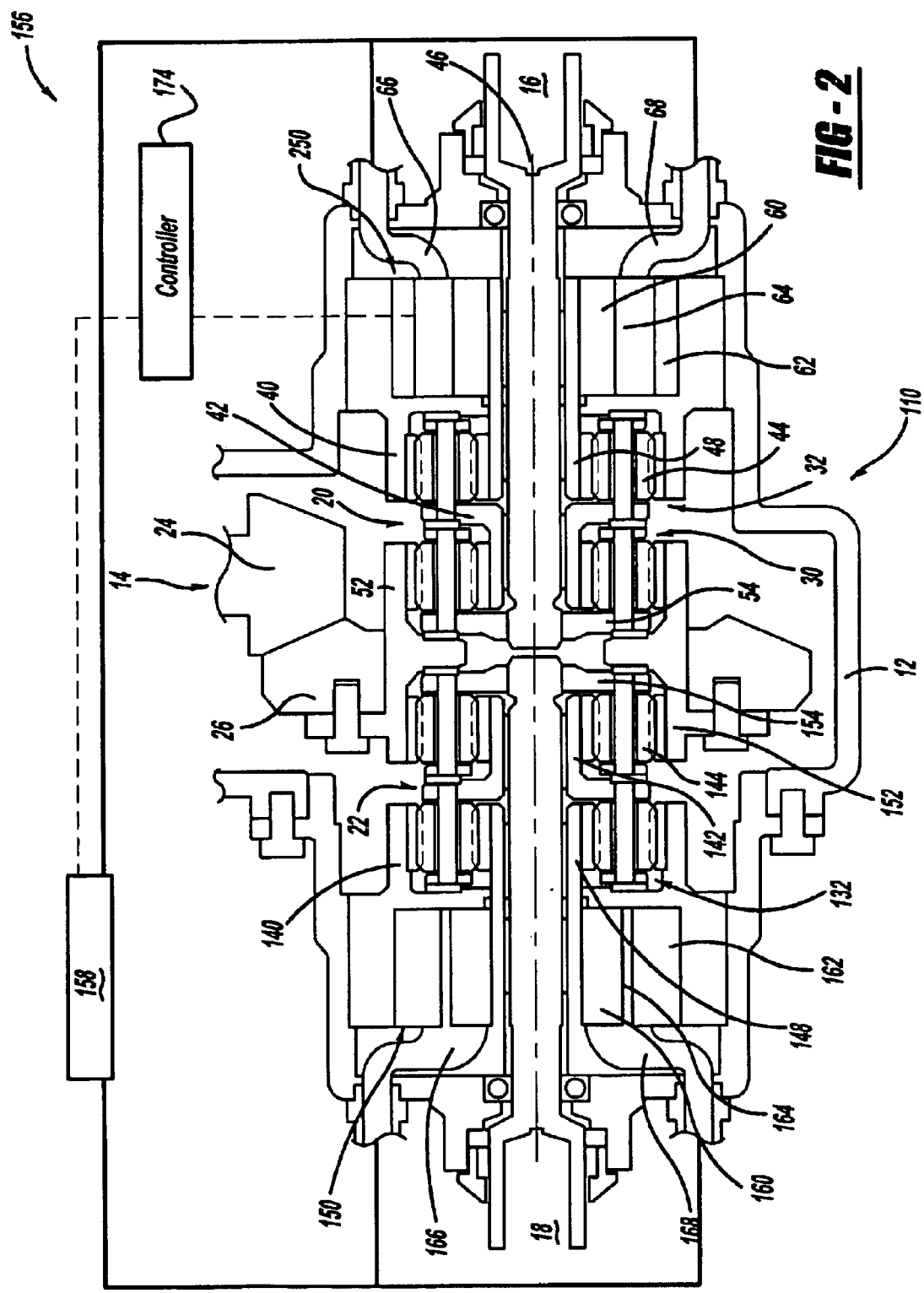
FIG. 2 is a sectional view of a second embodiment of the torque transfer assembly of the present invention with a planetary differential having a variable displacement pump.

The magnitude of the torque transferred from the inner ring gears 52, 152 to the output shafts is controlled by rotation of the sun gear 48, 148 of the outer planetary gear set 32, 132 which is dependent upon the rotational resistance provided by the torque control mechanisms 50. The torque control system 56 controls the condition of the torque control mechanisms 50 and is schematically illustrated in FIGS. 1 and 2 to include a processor or controller 74 communicating with a hydraulic control arrangement 58. While details of two embodiments of suitable torque control systems based on hydraulic control are described in detail below with respect to FIGS. 3–7 and 8–11, it should be appreciated that a variety of alternative control arrangements may be used. Further, as used herein, the term torque control mechanism is intended to encompass hydraulic, pneumatic, and electrical mechanisms capable of absorbing or exerting torque including pumps, motors, generators, and the like. It is further noted that while a variety of torque control mechanisms may be used, hydraulic or pneumatic pumps or motors are preferred due to their ability to efficiently and effectively dissipate heat generated during operation and the relatively low frictional losses associated therewith. Additionally, the embodiments of the hydraulic control arrangement described below permit the torque transfer assembly to be efficiently operated in a variety of operating modes thereby improving overall performance.

In the embodiment illustrated in FIG. 1, the torque control mechanisms 50 are fixed displacement hydraulic pumps generally shown to include an inner rotor 60, outer rotor 62, and fluid cavity 64. The sun gear 48 of the outer planetary gear set 32 is splined to rotate with the inner pump rotor 60 such that the inner rotor functions as a control element of the torque control mechanism. The outer rotor 62 is fixed to the housing 12. Rotation of the inner rotor 60 and the sun gear 48 relative to the outer rotor 62 and housing 12 is resisted by the fluid within a cavity 64. Thus, the rotational resistance provided by the sun gear 48 is controlled by the hydraulic control arrangement 58 which controls the fluid flow through, or pressure within, the cavity 64.

In a second embodiment of the torque transfer assembly illustrated in FIG. 2, at least one of the torque control mechanisms 250 is a variable displacement hydraulic pump or motor. In either instance, the rotation of the rotor 60, and therefore the sun gear 48, relative to the outer rotor 62 is resisted by the torque exerted by the pump or motor. As is generally known, this resistance torque (Tp/m) is the product of the displacement and the pressure divided by a constant ($2\pi$) or, stated in equation form:

$$Tp/m = ((\text{Displacement } p/m) * (\text{Pressure } p/m))/(2*\pi)$$

During normal driving conditions (i.e., straight ahead driving with adequate traction for each of the driven wheels) it is desirable to distribute torque equally between the driven output shafts 16 and 18. To achieve this condition, the product of the displacement and pressure of the first and second pumps must be equal. Conversely, when a differential torque distribution is desired, such as when assisting in turns or to control slip, the torque exerted by the torque control mechanism associated with the output shaft to be slowed may be decreased and/or the torque exerted by the pump associated with the output shaft to be rotated faster may be increased.

As noted above, when fixed displacement pumps are used, such as in the embodiment illustrated in FIG. 1, torque control is achieved by changing the fluid pressure within the pump/motor through the use of valves located in the outlet port of each fixed displacement pump. Specifically, when the wheel driven by shaft 16 slips, the outlet valve for the fixed displacement pump on this side is opened thereby reducing the torque transferred to the slipping wheel. In such a case, the torque control system 56 may apply the torque lost on this open side to the opposite wheel or maintain an even torque split, particularly for short duration slip events.

As noted above, in the torque transfer assembly 110 shown in FIG. 2, one or both of the torque control mechanisms are variable displacement pumps. While the embodiment illustrated in FIG. 1 is adequate for many applications, the alternative embodiment illustrated in FIG. 2 provides a more easily implemented control system and a reduction in energy losses. Those skilled in the art will appreciate that numerous types of variable displacement pumps generally known in the art are suitable for use with the present invention. By way of example rather than limitation, it is noted that such suitable variable displacement pumps would include variable displacement swashplate pumps, wobble pumps, and vane pumps. As is generally known in the art, the displacement of swashplate and wobble pumps may be variably controlled by changing the eccentricity of the plate that drives the pump pistons, such as by controlling the pressure applied to a servo piston associated with the plates. Further, the displacement of vane pumps may be varied by changing the eccentricity of the center shaft containing the vanes. A variety of conventional electromotive elements (such as a motor, solenoid, etc.) may be used to control a single or dual variable displacement pump system from a computer or micro-processor, such as controller 174.

The torque control system 156 illustrated in FIG. 2 includes a variable displacement pump 250 and a fixed displacement pump 150. When a change in the torque distribution is desired, the controller may either (a) adjust the displacement of the variable displacement pump 250 or (b) modify the fluid flow in the hydraulic system such as in the manner described above. In the former case, when additional speed is desired in the axle half-shaft on the same side as the fixed displacement pump, the displacement of the variable displacement pump is increased for the hydraulic circuit shown in FIGS. 4–7, and decreased for the hydraulic circuit shown in FIGS. 8–11. Conversely, if a reduction in speed is desired in the axle half-shaft on the same side as the fixed displacement pump, the displacement of the variable displacement pump is decreased for the hydraulic circuit shown in FIGS. 4–7, and increased for the hydraulic circuit shown in FIGS. 8–11.

As noted above, the invention also contemplates the use of two variable displacement pumps. In this case, the displacement controls for the variable displacement pumps are inversely connected so that the right pump loses displacement while the left pump gains displacement. The use of two variable displacement pumps decreases the response time of the system.

A variety of conventional fixed and variable displacement pumps may be used with the present invention. In general, pumps with low leakage rates are preferred to improve overall efficiency. Moreover, as variable displacement pumps are generally larger and more expensive than fixed displacement pumps, the operational and control benefits provided by the use of variable displacement pumps should be balanced against these additional weight and cost concerns.

As discussed above, the sun gears 48 and 148 of the outer planetary gear sets 32 and 132 control the magnitude of the torque transferred from hypoid gears to the output shafts. However, the inclusion of inner as well as outer planetary gear sets for each planetary differential has the further benefit of providing an additional reduction so that the size and capacity of the torque control mechanisms can be minimized yet still provide virtually zero to one hundred percent torque transfer to the right and left output shafts 16 and 18. This design is particularly suitable for heavy duty applications such as for trucks and sport utility vehicles.

Further benefits of the invention include the ability to easily and efficiently convert hydraulic pressure measurements to electrical signals, such as when using a positive displacement oil pump as the torque control mechanism. In such an arrangement, the torque exerted or absorbed by the displacement oil pump is a linear function of fluid pressure thereby permitting the use of relatively inexpensive pressure sensors to provide an electrical signal to the processor or controller. Additionally, as noted above, torque control mechanisms, such as oil pumps that use a fluid allow more efficient heat exchange or dissipation from the torque control mechanism. By way of example, commonly used "wet clutches" include a steel/paper interface where the paper acts as a prescribed friction material to interface with the steel. One advantage of using hydraulic pumps as the torque control devices is that the pumps do not have an interface that wears out as rapidly as friction-based systems (e.g., wet-clutches).

Figure 3:
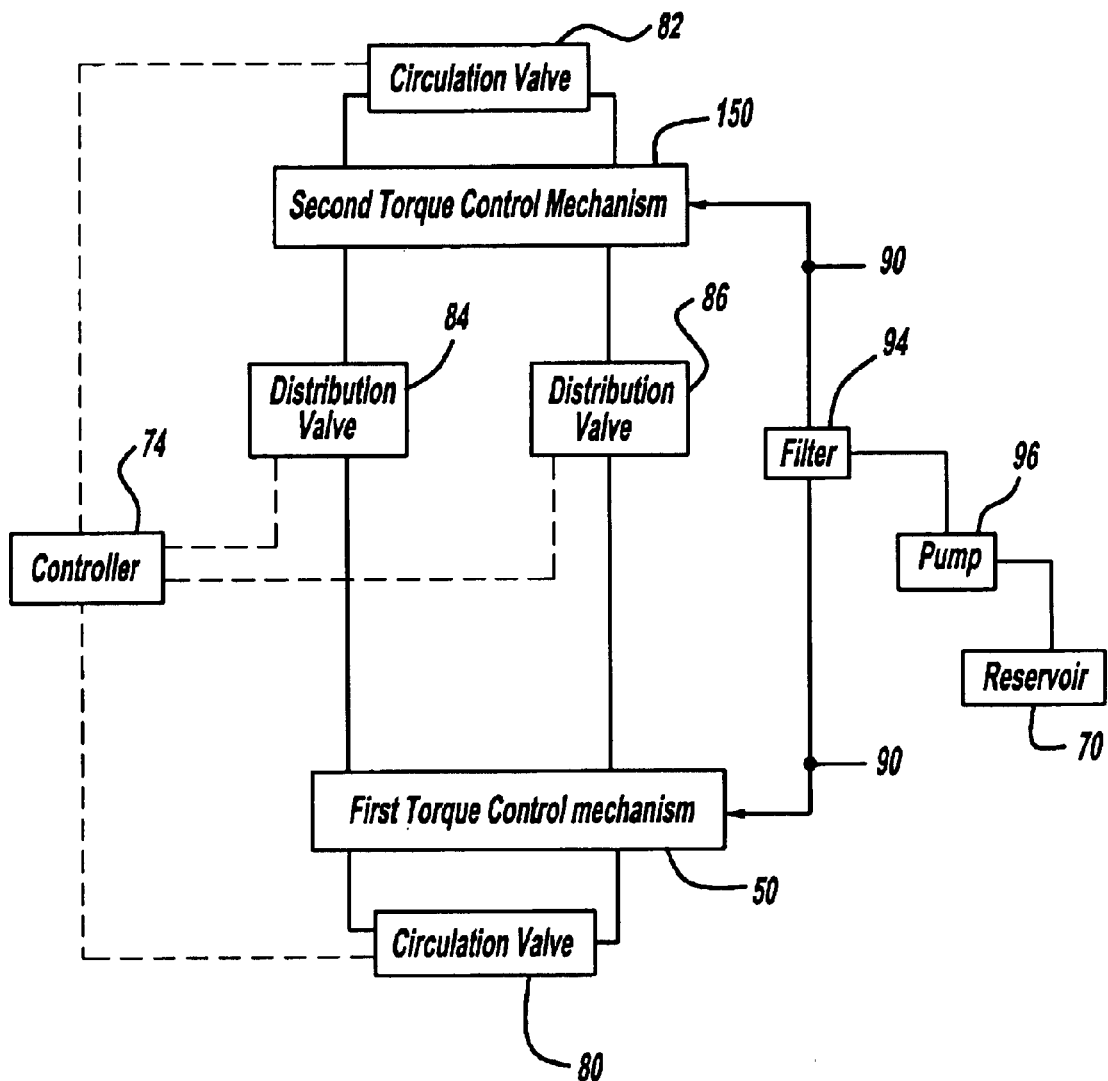
FIG. 3 is a schematic illustration of a representative torque control system for the torque control mechanisms shown in FIGS. 1 and 2.

As noted above, a variety of hydraulic control arrangements or strategies may also be incorporated to alter or enhance system performance. FIG. 3 schematically illustrates an embodiment of the torque control system 56 and hydraulic control arrangement 58 that communicate with the first and second torque control mechanisms of FIG. 1. As shown, the torque control system 56 includes the controller 74 and the hydraulic control arrangement 58 having right and left controlled circulation valves 80 and 82 disposed between the inlet and outlet of torque sources/sinks 50, 150 as well as distribution valves 84 and 86 that permit controlled fluid flow between the right and left fluid cavities 64 and 164. One-way valves 90 allow hydraulic lube to enter the circuit from the reservoir to offset leakage, etc. FIGS. 4–11 better illustrate this reservoir/pump replenishment system.

For special situations, such as traction control, vehicle dynamic control, and high degrees of controlled torque steering, the distribution valves 84 and 86 may be fully closed so as to disable the normal differential function and provide complete computer control. In this state, the controller selectively opens and closes the circulation valves 80 and 82 with slight changes in valve state corresponding to slightly less and more torque being transmitted to the corresponding output shaft. For example, when performing controlled torque steering in a right hand turn it is desirable to rotate the right output shaft faster than the left output shaft. In this instance, the controller may restrict fluid flow (to or from) the (right or left) torque source/sink thereby increasing the fluid pressure and (a) reducing the rotational speed of the sun gear (48 or 148) and (b) increasing the rotational speed of the right output shaft 16. Selected distribution of torque between the shafts 16 and 18 enhances handling of slip events, traction control, vehicle handling for dynamic control (high speed turns and the like), and controlled torque steering. It should be appreciated that fast acting valves, such as PWM solenoid valves, are preferred in order to provide fast response time, minimize losses, and otherwise improve performance. However, other controllable valves, such as throttle valves and the like, may be used with the invention. Further, it should be appreciated that a plurality of pressure sensors may be associated with the conduits or valves in order to provide feedback for the controller 74.

The following discussion of FIGS. 4–11 provide additional detail with respect to two embodiments of the hydraulic control arrangement 58, 158, each capable of controlling fluid flow between the first and second torque mechanisms, whether the mechanisms are of the variable or fixed displacement variety. In each embodiment, the hydraulic control arrangement includes the reservoir 70, check valves 90, a relief valve 92, a filter 94, an auxiliary pump 96, and a plurality of directional control valves 98a–98d. The directional control valves 98a–98d represent a preferred embodiment of valves 80, 82, 84, and 86 shown in FIG. 3. The illustrated torque control mechanisms 350a and 350b may be fixed or variable displacement pumps as described above. The controller 74 selectively positions each of the directional control valves to control the direction and amount of fluid flow.

Figure 4:
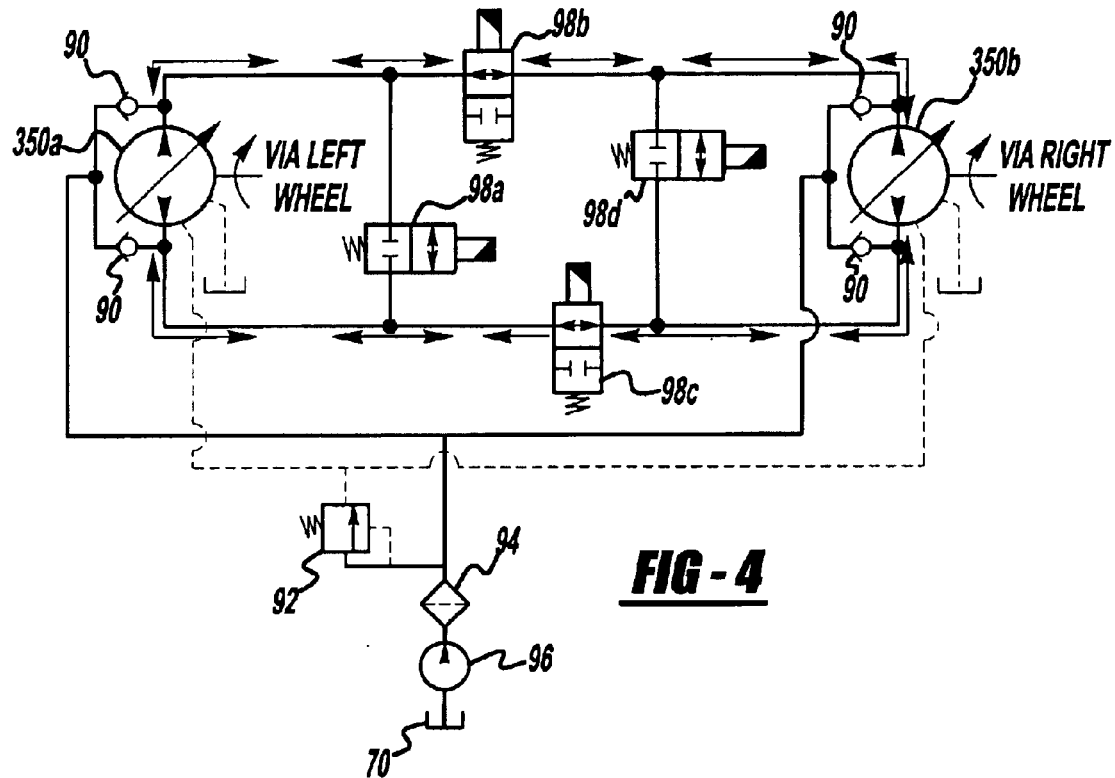
FIG. 4 is a schematic illustration of a hydraulic control arrangement consistent with the schematic shown in FIG. 3 and with the valve positions providing equalized and self-compensating torque distribution to the two output shafts.
Figure 5:
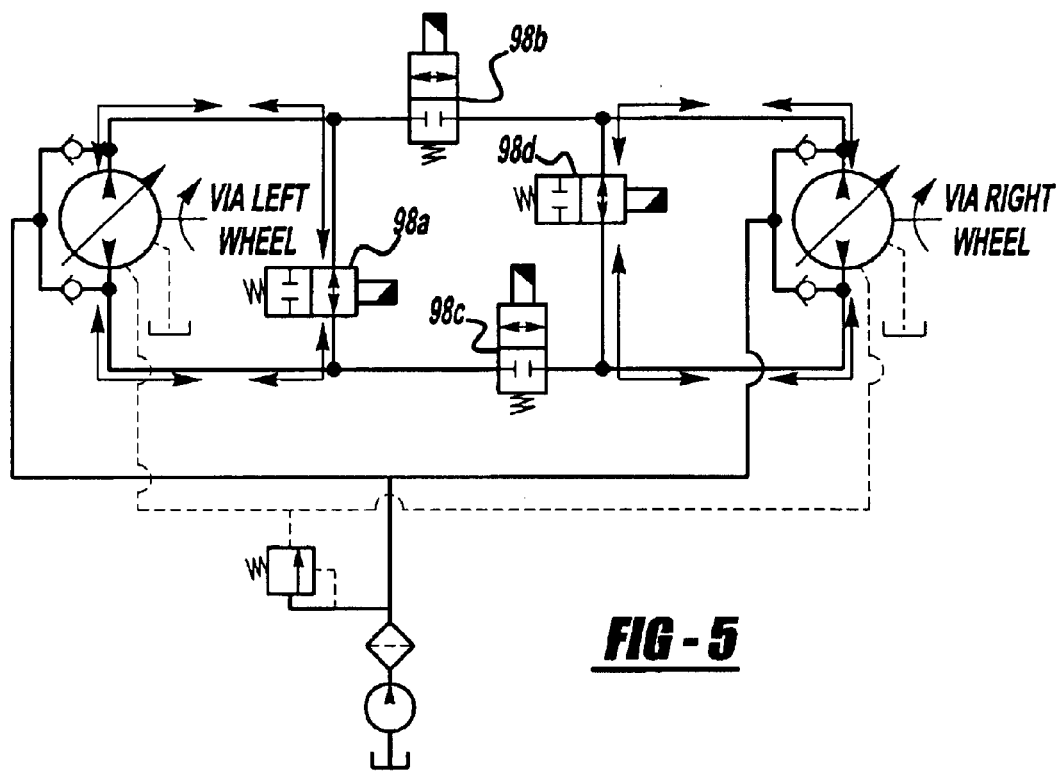
FIG. 5 is a schematic illustration of the hydraulic control arrangement of FIG. 4 with the valve positions permitting both pumps to rotate freely with no torque communication to either of the driven output shafts.
Figure 6:
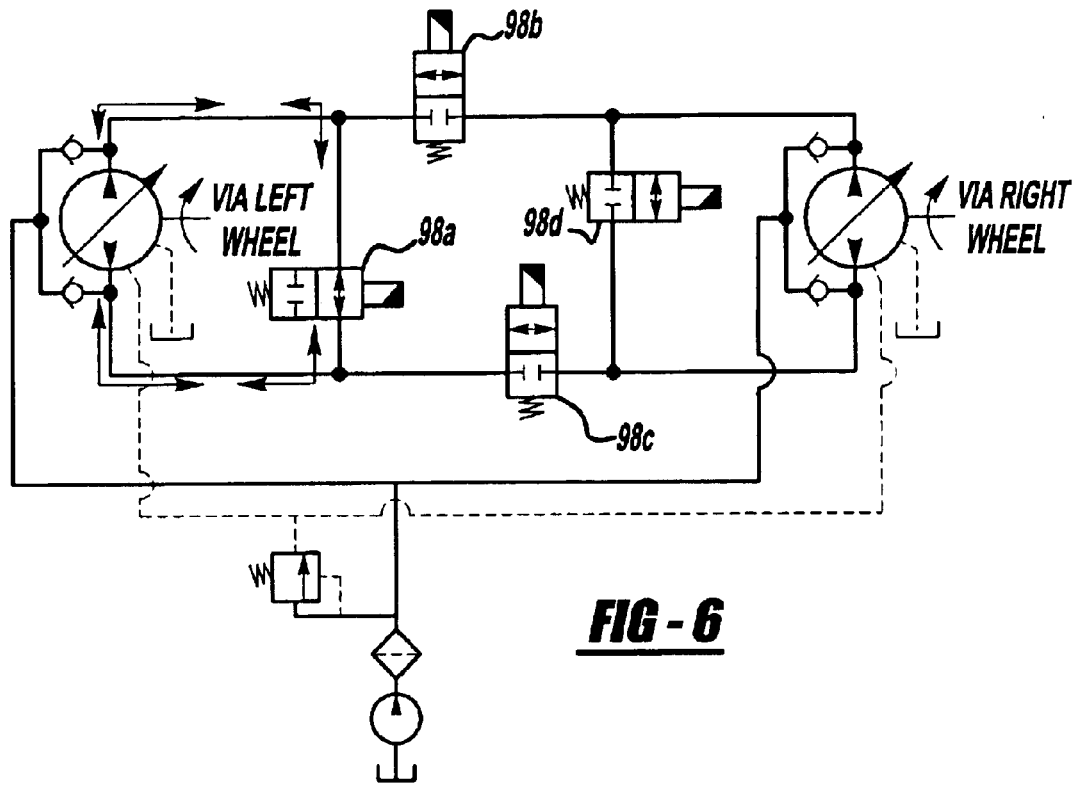
FIG. 6 is a schematic illustration of the hydraulic control arrangement of FIG. 4 with the valve positions providing all drive torque to the right side output shaft.
Figure 7:
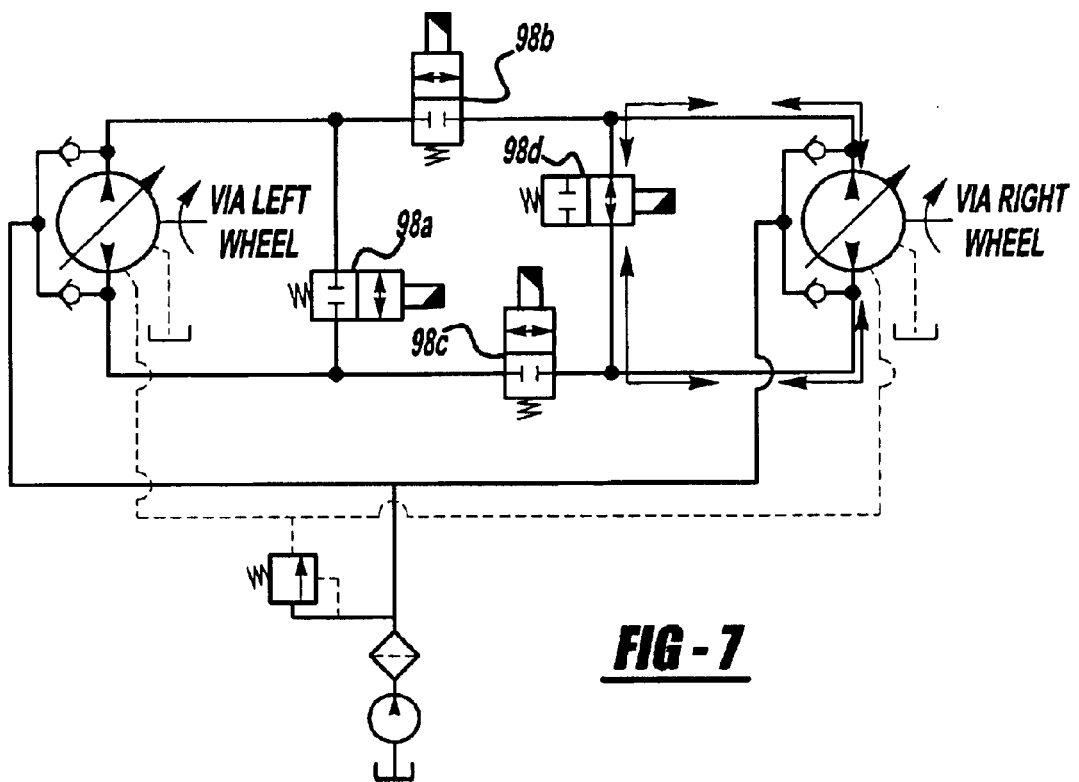
FIG. 7 is a schematic illustration of the hydraulic control arrangement of FIG. 4 with the valve positions providing all drive torque to the left side output shaft.

A variety of valve positions are shown in FIGS. 4–7 to illustrate the selective control of torque distribution to each output. In general, the differentiation provided by the torque control system is a function of the position of the valves and the amount and direction of fluid flow provided thereby. For example, FIG. 4 illustrates valve positions that provide an equalized and self-compensating torque distribution to the two output shafts (e.g., a first operating mode of the hydraulic control arrangement). More particularly, with valves 98b and 98c open and valves 98a and 98d closed, the torque control mechanisms 350a and 350b pump fluid against one another such that when one shaft rotates faster than the other, such as during a slip event or a turn, the increased fluid displacement acts on the other pump to provide self-compensating torque distribution. FIG. 5 shows valves 98a and 98d open and valves 98b and 98c closed such that both pumps 350a and 350b freely rotate providing no torque communication to either of the driven output shafts (e.g., a second hydraulic control arrangement operating mode). Finally, FIGS. 6 and 7 illustrate valve positions for providing all drive torque to the right and left side output shafts, respectively (collectively referred to as a third operating mode).

Figure 8:
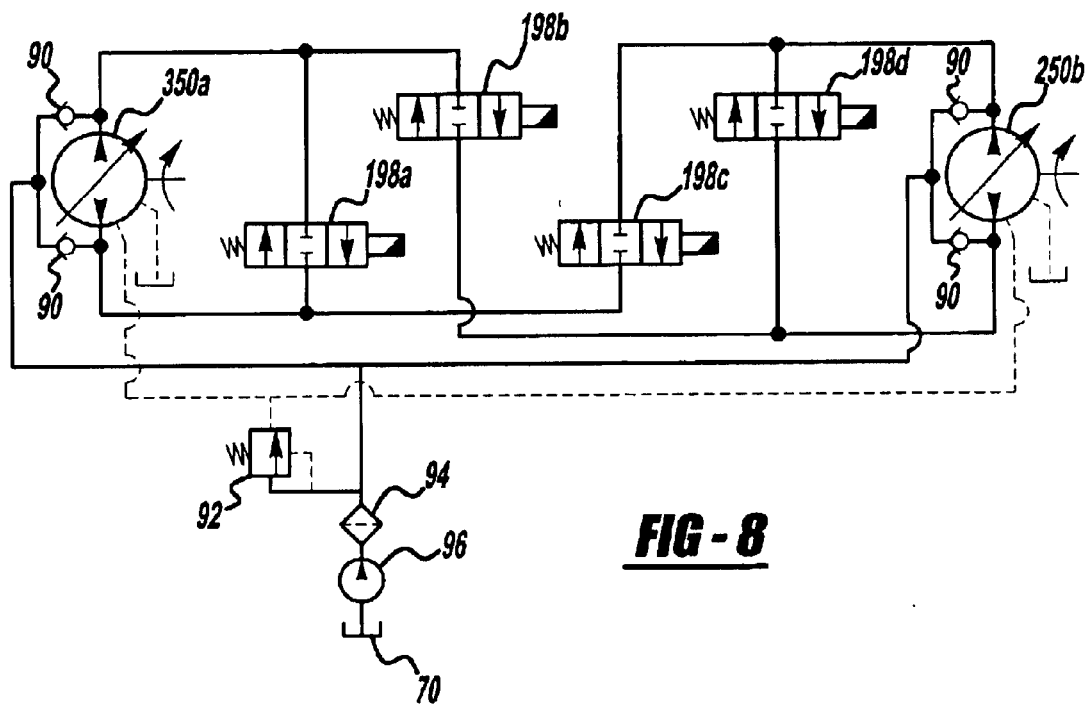
FIG. 8 is a schematic illustration of a second hydraulic control arrangement embodiment generally consistent with the schematic shown in FIG. 3 and with the valves in positions for providing even torque split, with or without differentiation, to the left and right wheels.
Figure 9:
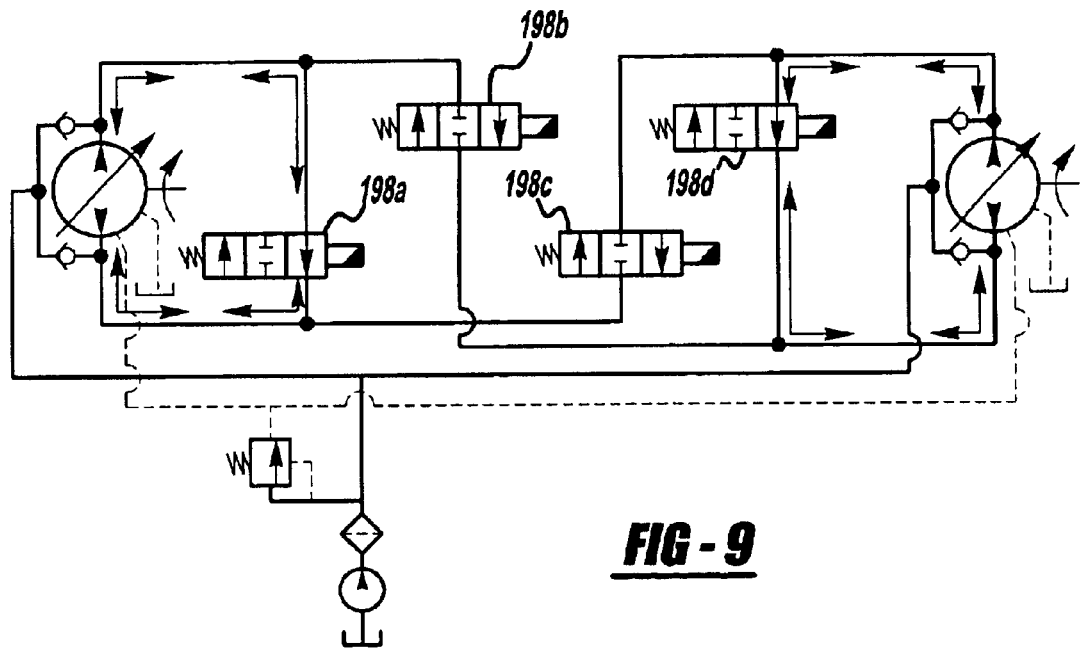
FIG. 9 illustrates the hydraulic control arrangement of FIG. 8 with directional valve positions permitting both pumps to rotate freely with no torque communication to either of the driven output shafts.
Figure 10:
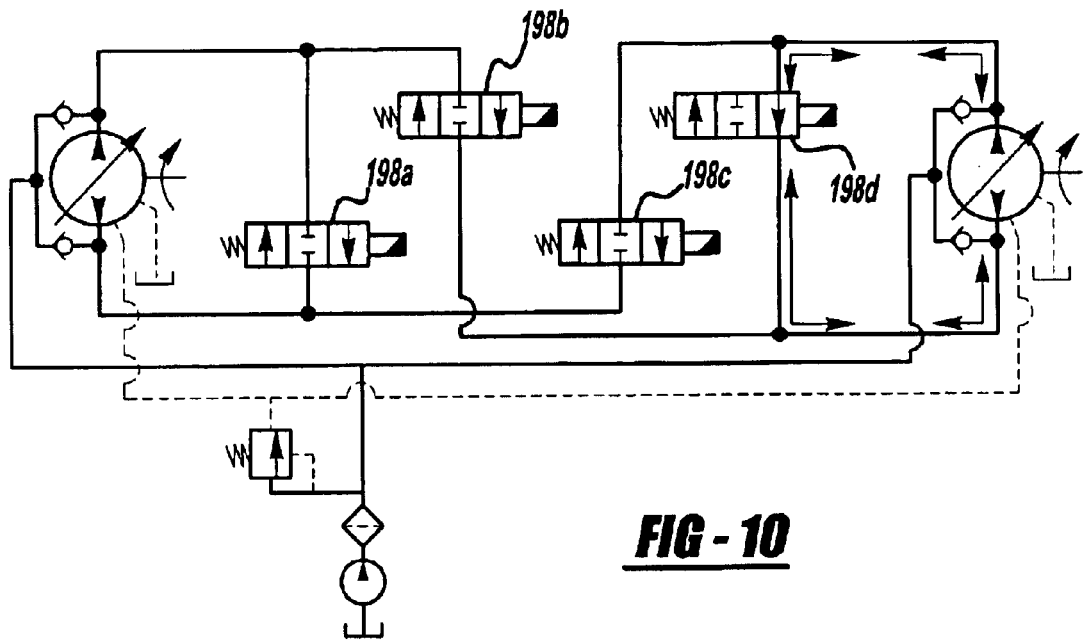
FIG. 10 illustrates the hydraulic control arrangement of FIG. 8 with directional valve positions distributing all drive torque to the left side output shaft.
Figure 11:
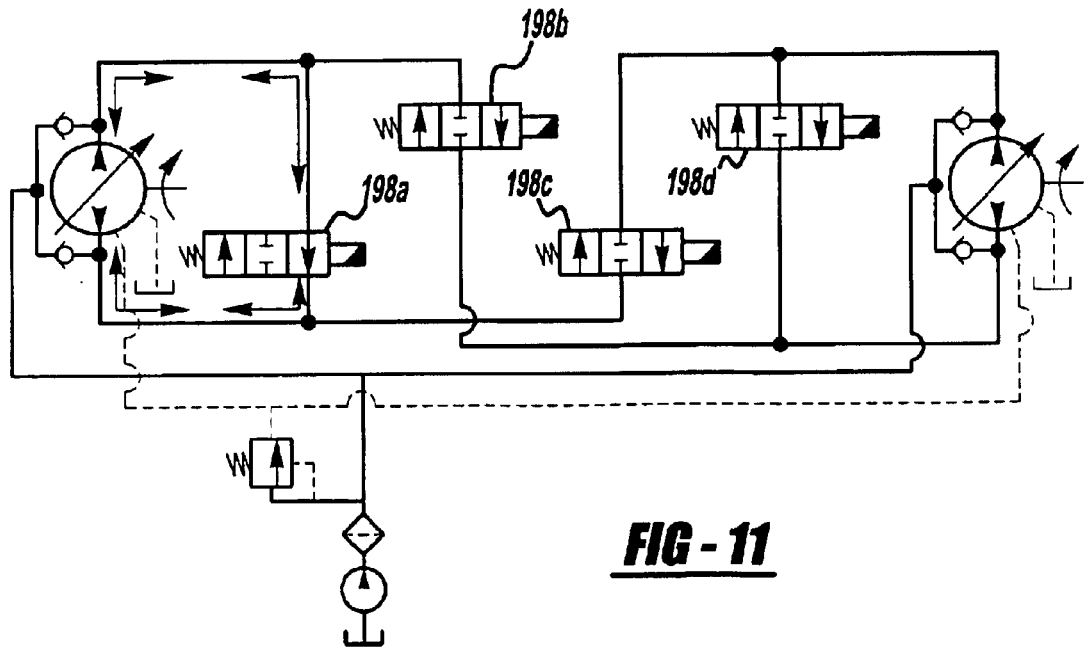
FIG. 11 illustrates the hydraulic control arrangement of FIG. 8 with directional valve positions providing all drive torque to the right side output shaft.

A second embodiment of the hydraulic control arrangement is shown in FIGS. 8–11. In this embodiment, the fluid flow paths between the torque control mechanisms 350a and 350b are modified. A plurality of directional control valves 198a–198d are again included and under the control of the controller 74 to control the amount and direction of fluid flow and therefore the torque distribution between the driven shafts. In FIG. 8, each of the valves 198a–198d are closed such that the torque control mechanisms 350a and 350b pump against the closed valves providing a locked differential with no torque differentiation and an even torque split between the driven shafts. When differentiation is desired, the controller 74 can selectively position the valves between fully closed and fully open positions, including partially or incrementally opening or closing the valves, in order to differentiate the torque provided to each shaft. While this valve arrangement (referred to as a fourth operating mode for the hydraulic control arrangement) is not shown in the figures illustrative of the first embodiment of the hydraulic control arrangement, it should be appreciated that the arrangement is equally applicable to the first embodiment. FIGS. 9, 10, and 11 each show valve arrangements similar to those illustrated in FIGS. 5, 6, and 7 of the first embodiment to provide free rotation of the pumps and no torque communication (FIG. 9), all torque to the left side output shaft (FIG. 10), and all torque to the right side output shaft (FIG. 11), respectively. It should be noted when zero torque distribution to both wheels is desired, valves 198b and 198c can be opened and valves 198a and 198d closed thereby permitting lube circulation between the two pumps. The benefits of this arrangement includes lube temperature equalization, dilution of existing contaminants, etc. Further, while not specifically described above, those skilled in the art will appreciate that the hydraulic control arrangement also includes a variety of pressure sensors, preferably at least four such sensors, in order to provide a feedback control system for the operation of the hydraulic control arrangement and therefore the torque control system in the above described operating modes.

Based on these illustrations of two embodiments of the hydraulic control arrangement, those skilled in the art will appreciate that various modifications may be made to the torque control system 56 of the present invention without departing from the scope of the appended claims. For example, those skilled in the art will appreciate that the torque control system 56 and the hydraulic control arrangement 58 provide numerous control benefits that may be realized separate from or in combination with planetary differentials having right and left planetary gear set pairs as illustrated or with single planetary arrangements associated with each of the output shafts. Further, while FIGS. 8–11 illustrate the valve positions for torque control during forward vehicle motion, the present invention is equally suited for providing torque control during both forward and rearward vehicle motion. This bi-directional control is generally illustrated by the bi-directional valves shown in each of FIGS. 4–11.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A torque transfer assembly comprising:
    an input gear;
    a first output shaft;
    a second output shaft;
    a planetary differential including
        a first planetary gear set pair drivably intercoupling said input gear with said first output shaft, said first planetary gear set pair including inner and outer planetary gear sets, each of said inner and outer planetary gear sets including a sun gear, a ring gear, a planetary carrier, and at least one planet gear mounted on said planetary carrier to rotate with and relative to said planetary carrier and meshed with the sun gear and ring gear, and
        a second planetary gear set pair drivably intercoupling said input gear with said second output shaft, said second planetary gear set pair including inner and outer planetary gear sets, each of said inner and outer planetary gear sets including a sun gear, a ring gear, a planetary carrier, and at least one planet gear mounted on said planetary carrier to rotate with and relative to said planetary carrier and meshed with the sun gear and ring gear;
        wherein, in the first and second planetary gear set pairs, the planetary carrier of the outer planetary gear set is fixed to rotate with the sun gear of the inner planetary gear set, and
    a torque control system including
        a first torque control mechanism having a first control element rotating with one of the ring gear, sun gear, or planetary carrier of the inner or outer planetary gear sets of the first planetary gear set pair,
        a second torque control mechanism having a second control element rotating with one of the ring gear, sun gear, or planetary carrier of the inner or outer planetary gear sets of the second planetary gear set pair, and
        a controller communicating with the first and second torque control mechanisms and selectively controlling a resistance torque exerted by the first and second torque control mechanisms on the first and second control elements.

2. The torque transfer assembly of claim 1 wherein one of said first and second torque control mechanisms includes a fixed displacement hydraulic pump or motor.

3. The torque transfer assembly of claim 2 wherein the other of said first and second torque control mechanisms includes a variable displacement hydraulic pump or motor.

4. The torque transfer assembly of claim 3 wherein the variable displacement hydraulic pump or motor has a maximum displacement greater than a displacement of the fixed displacement hydraulic pump or motor and a minimum displacement less than the displacement of the fixed displacement hydraulic pump or motor.

5. The torque transfer assembly of claim 1 wherein each of said first and second torque control mechanisms is a fixed displacement hydraulic pump or motor.

6. The torque transfer assembly of claim 1 wherein each of the first and second torque control mechanisms includes a variable displacement hydraulic pump or motor.

7. The torque transfer assembly of claim 6 wherein said controller inversely varies the displacement of the first variable displacement hydraulic pump or motor relative to the displacement of the second variable displacement hydraulic pump or motor to selectively control the resistance torque exerted on the first and second control elements.

8. The torque transfer assembly of claim 1 wherein
one of said sun gear, ring gear, and planet carrier of said inner planetary gear set of said first planetary gear set pair is fixed to rotate with the first output shaft,
one of said sun gear, ring gear, and planet carrier of said outer planetary gear set of said first planetary gear set pair is fixed to rotate with said first control element,
wherein one of said sun gear, ring gear, and planet carrier of said inner planetary gear set of said second planetary gear set pair is fixed to rotate with the second output shaft, and
one of said sun gear, ring gear, and planet carrier of said outer planetary gear set of said second planetary gear set pair is fixed to rotate with said second control element.

9. The torque transfer assembly of claim 1 wherein said controller controls said torque control mechanisms to selectively communicate between substantially zero and substantially all torque to the first and second output shafts.

10. The torque transfer assembly of claim 9 wherein the torque control system further includes a hydraulic control arrangement having a fluid reservoir and a plurality of conduits and valves hydraulically intercoupling said first and second torque control mechanisms, said controller controllably communicating with said valves to selectively communicate between substantially zero and substantially all torque to the first and second output shafts.

11. The torque transfer assembly of claim 10 wherein said controller selectively operates said hydraulic control arrangement in one of a first, second, third, and fourth operating mode, and wherein
said first operating mode provides equalized and self-compensating torque distribution between the first and second output shafts,
said second operating mode provides substantially no torque to either of the first and second output shafts,
said third operating mode provides substantially all torque to only one of said first and second output shafts, and
said fourth operating mode provides an even torque split with or without differentiation to the first and second output shafts.

12. The torque transfer assembly of claim 10 wherein said hydraulic control arrangement includes first, second, third, and fourth valves operable to control the direction and amount of fluid flow in the hydraulic control system.

13. A torque transfer assembly comprising:
a torque input;
a first output shaft;
a second output shaft;
a planetary differential including a first planetary gear assembly drivably intercoupling said torque input with the first output shaft and a second planetary gear assembly drivably intercoupling said torque input with the second output shaft; and
a torque control system including
a first torque control mechanism having a first control element meshed with said first planetary gear assembly, said first torque control mechanism operable to exert a variable resistance torque on said first control element to control the rotation of the first planetary gear assembly,
a second torque control mechanism having a second control element meshed with said second planetary gear assembly, said second torque control mechanism operable to exert a variable resistance torque on said second control element to control the rotation of said second planetary gear assembly,
a hydraulic control arrangement hydraulically communicating with each of said first and second torque control mechanisms, and
a controller operable to selectively control the direction and amount of fluid flow in the hydraulic control arrangement and the resistance torque exerted by the first and second torque control mechanisms, wherein said controller selectively operates said hydraulic control arrangement in one of a first, second, third, and fourth operating mode, and wherein
said first operating mode provides equalized and self-compensating torque distribution between the first and second output shafts,
said second operation mode provides substantially no torque to either of the first and second output shafts,
said third operating mode provides substantially all torque to only one of said first and second output shafts, and
said fourth operating mode provides an even torque split without differentiation to the first and second output shafts.

14. The torque transfer assembly of claim 13 wherein said hydraulic control arrangement includes first, second, third, and fourth valves and wherein the controller controls a position of the first, second, third, and fourth valves to operate said hydraulic control arrangement in one of a first, second, third, and fourth operating mode, and wherein
said first operating mode provides equalized and self-compensating torque distribution between the first and second output shafts,
said second operating mode provides substantially no torque to either of the first and second output shafts,
said third operating mode provides substantially all torque to only one of said first and second output shafts, and
said fourth operating mode provides an even torque split with or without differentiation to the first and second output shafts.

15. The torque transfer assembly of claim 13 wherein said controller is operable to selectively communicate between substantially zero and substantially all torque to the first and second output shafts.

16. The torque transfer assembly of claim 13 wherein said hydraulic control arrangement is normally operated in said first operating mode.

17. The torque transfer assembly of claim 13 wherein one of said first and second torque control mechanisms includes a fixed displacement hydraulic pump or motor.

18. The torque transfer assembly of claim 15 wherein the other of said first and second torque control mechanisms includes a variable displacement hydraulic pump or motor and wherein the variable displacement hydraulic pump or motor has a maximum displacement greater than a displacement of the fixed displacement hydraulic pump or motor and a minimum displacement less than the displacement of the fixed displacement hydraulic pump or motor.

* * * * *